United States Patent [19]

Zepke

[11] Patent Number: 4,799,243

[45] Date of Patent: Jan. 17, 1989

[54] DIRECTIONAL PEOPLE COUNTING ARRANGEMENT

[75] Inventor: Bruce E. Zepke, Glastonbury, Conn.

[73] Assignee: Otis Elevator Company, Farmington, Conn.

[21] Appl. No.: 91,622

[22] Filed: Sep. 1, 1987

[51] Int. Cl.[4] ........................ G08B 13/18; G06M 7/00; G01J 5/08

[52] U.S. Cl. ........................................ 377/6; 250/338.3; 250/342; 340/567

[58] Field of Search ........................ 328/6, 7; 377/6, 9, 377/7; 340/567, 584, 600; 250/342, 353, 338 PY

[56] References Cited

U.S. PATENT DOCUMENTS

| | | | |
|---|---|---|---|
| 3,141,612 | 7/1964 | Bolton | 377/9 |
| 4,000,400 | 12/1976 | Elder | 377/6 |
| 4,263,585 | 4/1981 | Schaefer | 250/342 |
| 4,303,851 | 12/1981 | Mottier | 377/6 |
| 4,342,987 | 8/1982 | Rossin | 340/567 |
| 4,346,427 | 8/1982 | Blisset et al. | 340/573 |
| 4,523,095 | 6/1985 | Keller-Steinbach | 250/353 |
| 4,612,442 | 9/1986 | Toshimichi | 340/567 |
| 4,745,284 | 5/1988 | Masuda et al. | 250/338.3 |

FOREIGN PATENT DOCUMENTS

| | | | |
|---|---|---|---|
| 0235327 | 9/1987 | European Pat. Off. | 340/567 |
| 0131884 | 10/1980 | Japan | 377/6 |
| 557069 | 12/1972 | Switzerland | 340/567 |

OTHER PUBLICATIONS

F. Schwartz, "Performance of Narrow Field, Passive, Infra-Red Intrusion Detector", Proceedings of The Society of Photo-Optical, Sep. 1972, pp. 51-56.

*Primary Examiner*—John S. Heyman
*Assistant Examiner*—Tai V. Duong
*Attorney, Agent, or Firm*—Peter R. Ruzek

[57] ABSTRACT

An arrangement for detecting the passage of living beings through a surveillance region into and out of a controlled-access space includes at least one pyroelectric detector device that includes two detector elements which have active areas that are directly exposed to thermal radiation from the surveillance region and convert the thermal radiation energy received thereby into electrical signals with opposite polaritites. The detector elements are situated in succession in the direction of passage into the controlled-access space. The surveillance region is optically subdivided into two surveillance zones arranged in succession as considered in the passage direction, for instance by a mask that masks an intervening zone situated between the surveillance zones to prevent thermal radiation from the intervening zone from reaching either one of the detector elements. Thus, the thermal radiation energy from a living being passing through the surveillance region reaches initially only one and subsequently only the other of the detector elements when such living being is entering, and initially only the other and subsequently only the one detector element when such living being is leaving, the controlled-access space. The opposite polarity electrical signals are then evaluated on the basis of their then existing lead/lag relationship.

11 Claims, 3 Drawing Sheets

DIRECTIONAL PEOPLE COUNTING ARRANGEMENT

DESCRIPTION

TECHNICAL FIELD

The present invention relates generally to detecting equipment, and more particularly to a detecting arrangement capable of counting the number of people passing in opposite directions through a surveillance region, such as an elevator or other doorway.

BACKGROUND ART

There are already known various arrangements for detecting penetration of humans into and/or their movement in a controlled region. Such detecting arrangements are being used, for example, to defend a perimeter of an installation, to monitor movement of personnel within an installation, to detect the presence of people on premises or the like. Detecting or sensing equipment of different types has been used, more or less successfully, for the above and similar detecting purposes. So, for instance, U.S. Pat. No. 4,263,585 discloses an intrusion detection system in which a multi-segment mirror focuses thermal radiation emanating from a moving person onto a thermopile detector in such a manner that each mirror segment separately directs the radiation in succession to detector elements, whereby the direction of movement of such a person can be determined. Another control device responsive to infrared radiation is disclosed in U.S. Pat. No. 4,346,427, wherein an infrared sensor is being used to detect any movement of a person into or within the region under surveillance. The output signal of this sensor is utilized for controlling the operation of lights, air conditioning or the like for the affected region. A control device of this type is also disclosed in the published international patent application No. PCT/US81/01769 (International Publication No. WO 82/02270). Moreover, a passive infrared occupancy detector of a similar type has been developed by Tishman Research Co. and United Technologies Corporation and is commercially available under the designation Infracon Model 628.

As advantageous as the above devices may be for the purposes for which they have been developed, they are not well suited for determining the number of people passing through the region under surveillance, such as an elevator doorway, and the direction of passage of such people through the surveillance region. Yet, in some instances, it would be desirable to possess this information so as to be able to use it for various purposes, such as for determining the number of people present in an elevator in order to estimate the elevator load, for determining the number of people entering and leaving an elevator at any of the various floors of a building to determine the traffic flow pattern in the building for use in elevator dispatching, or the like. However, until recently, no attempts have been made to utilize any such known detecting equipment of the above kind for controlling the operation of elevators, in spite of the fact that the previously existing elevator dispatching techniques left much to be desired as far as their effectiveness and responsiveness were concerned, since elevator control systems employing such known dispatching techniques were being operated solely on the basis of floor calls, albeit possibly taking into consideration some recurring traffic patterns, for instance, those ordinarily repeating themselves in the course of the day.

In any event, however, elevators have heretofore usually been dispatched to the various floors without any real-time information as to the actual traffic flow. More particularly, no attempts have been made in the performance of such preexisting elevator dispatching techniques to use or even to gather information concerning the number of people waiting at a landing, be it because it was not recognized that this information, while presenting less than a complete picture of the traffic flow to occur in that the destination floors of the people waiting for an elevator to arrive would not be known, could nevertheless be used in controlling the operation of the elevator in a considerably more economical manner than that possible before, without unduly burdening the people waiting for the elevator to arrive or those already in the elevator, or because it was felt that it would be impossible to reliably collect this information or that the cost of gathering this information would outweigh any benefits derived therefrom, or for other reasons. It was not until quite recently that it was recognized that the above information could indeed be used to advantage in controlling the operation of elevators, and that attempts have been made to develop approaches to the gathering and use of such information. So, for instance, it was proposed to utilize passive infrared sensors for such applications. Yet, the heretofore proposed approaches left much to be desired, especially as far as the accuracy or veracity of the information gathered by such detecting equipment was concerned.

On the other hand, various attempts have already been made, mainly for safety reasons, to develop techniques for measuring or estimating the elevator load, such as weight-measuring sensors mounted on the elevator. However, equipment of this type is sensitive only to the total weight of the elevator occupants and not to their number. In other words, this equipment is not capable of distinguishing between the presence in the elevator of, say, on the one hand, one elevator user who is rather heavy, and on the other hand, two or three elevator users who are individually much lighter. Thus, this equipment does not provide reliable information about the actual number of elevator occupants or about the actual number of people entering or leaving the elevator at the particular floors. To avoid this inadequacy, it was proposed to provide doubled light barriers strategically positioned across the elevator doorway, the idea being that a person entering the elevator will interrupt one light beam first and the other light beam second, while a person leaving the elevator will interrupt the other light beam first and the one light beam second. However, experience with this approach has shown that the obtained results are very unreliable since they can be rather easily adversely affected by two people simultaneously entering and/or leaving the elevator, by hand or leg movements of the person entering or leaving the elevator, by obscuration caused by a hand or an arm of a person holding the elevator door, or the like.

Accordingly, it is a general object of the present invention to avoid the disadvantages of the prior art.

More particularly, it is an object of the present invention to provide an arrangement for detecting passage of living beings through a surveillance region, which arrangement does not possess the disadvantages of the known arrangements of this kind.

It is yet another object of the present invention to develop the arrangement of the above type in such a manner as to be able to generate reliable information as to the number of people present in an elevator or in any other enclosed space, such as an elevator landing, at any given time.

Still another object of the present invention is to design the above arrangement in such a manner as to be able to accurately individually record the entry of people into and their exit from the enclosed space even if such people enter and/or leave the enclosed space simultaneously.

A concomitant object of the present invention is so to construct the above arrangement as to be relatively simple in construction, inexpensive to manufacture, easy to install and use, and reliable in operation nevertheless.

DISCLOSURE THE INVENTION

In keeping with these objects and others which will become apparent hereafter, one feature of the present invention resides in an arrangement for detecting the passage of living beings through a surveillance region into and out of a controlled access space. This arrangement includes at least one pyroelectric detector device that includes two detector elements each of which has an active area that is directly exposed to thermal radiation from the surveillance region and converts thermal radiation energy received thereby into an electrical signal. The detector elements are situated in succession in the direction of passage into the controlled-access space and are coupled in such a manner that the electrical signal has one polarity for one of the detector elements and the opposite polarity for the other detector element. Optical means directs thermal radiation energy from the surveillance region onto the active areas of the detector elements. The optical means includes means for optically subdividing the surveillance region into two surveillance zones arranged in succession as considered in the aforementioned direction so that the thermal radiation energy from a living being passing through the surveillance region reaches initially only one and subsequently only the other one of the detector elements when such living being is entering the controlled-access space. Conversely, the thermal radiation energy reaches initially only the other and subsequently only the one detector element when the living being is leaving the controlled-access space. The detector device then generates the opposite polarity electrical signals in one lead/lag time relationship for a living being entering, and in the opposite lead/lag relationship for a living being leaving, the controlled-access space through the surveillance region. There is further provided means for evaluating the electrical signal of the detector device to provide an indication of the entry and/or exit of a living being through the surveillance region from the then existing lead/lag relationship of the opposite polarity electrical signals.

Advantageously, the optical means may include means for masking an intervening zone situated between the surveillance zones to prevent thermal radiation from the intervening zone from reaching either one of the detector elements.

It is particularly advantageous when the evaluating means includes means for generating a first output signal when one of the opposite polarity signals leads the other and a second output signal when the one of the opposite polarity signals lags behind the other, and when there are provided three of the detector devices arranged side-by-side above an entryway to be surveilled such that the surveillance regions of such detector devices transversely span the entryway. Then, the evaluating means includes three of the generating means each associated with a different one of the detector devices. According to the invention, there are then further provided two combination circuits one receiving the first output signals and the other the second output signals from all of said generating means. Each of these combinations circuits is so constructed as to issue a single output signal when the respective first or second signal is present from the generating means associated with the central one but not from either one of the generating means associated with the lateral ones of the detector devices, or from one but not from the other of the generating means associated with the lateral detector devices, and to issue two output signals when the respective first output signal is present from the generating means associated with both of the lateral detector devices.

BRIEF DESCRIPTION OF THE DRAWING

The present invention will be described in more detail below with reference to the accompanying drawing, in which.

BEST MODE FOR CARRYING OUT THE INVENTION

Figure 1:
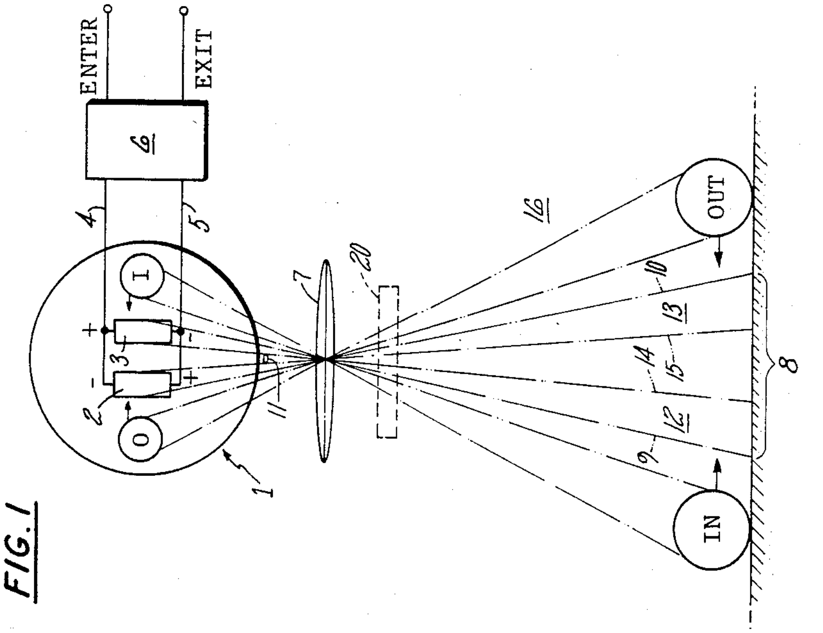
FIG. 1 is an exploded simplified partly bottom plan and partly side elevational view of a pyroelectric detecting arrangement of the present invention and of the environment in which it is being used.

Referring now to the drawing in detail, and first to FIG. 1 thereof which is a diagrammatic partly bottom plan view and partly side elevational view of a detector arrangement 1 of the present invention and of the environment in which the arrangement 1 is being used, it may be seen that the arrangement 1 includes two detector elements 2 and 3. The detector elements 2 and 3 are interposed with opposite polarities between two output lines 4 and 5 that carry electrical output signals of the arrangement 1. The output lines 4 and 5 lead to an evaluating circuit which is identified in its entirety by the reference numeral 6 and which evaluates the electrical output signals of the arrangement 1, as will be described in detail later. The detector arrangement 1 may be of any known type sensitive to infrared radiation, but preferably is of a pyroelectric type, such as that commercially available from Eltec Instruments Inc. under the designation ELTEC 5192 or ELTEC 442-3.

In the installation of FIG. 1, a lens 7 concentrates electromagnetic radiation, especially that in the infrared range of the spectrum, from a region 8 to be surveilled, especially from a doorway, such as that of an elevator, onto the detector arrangement 1. Rays 9 and 10 indicate the outer boundaries of this surveillance region 8. A mask 11 is shown to be interposed between the lens 7 and the detector arrangement 1. This mask 11 subdivides the surveillance region 8 into two surveillance zones 12 and 13 that are inwardly delimited by rays 14 and 15.

The detector arrangement 1 and the mask 11 are so positioned relative to the surveillance region 8 that a person entering a space 16 through the surveillance region 8, as indicated by a circled IN at the lower part of FIG. 1, will first pass through the zone 12 and then, some time later, through the zone 13. An image of such an entering person, which is correspondingly indicated by a circled I in the upper part of FIG. 1, will thus travel across the detector element 3 first and then, some time later, across the detector element 2. Conversely, a person leaving the controlled-access space 16 through the surveillance region 8, as indicated by a circled OUT at the lower part of FIG. 1, will first pass through the zone 13 and then, some time later, through the zone 12. Hence, an image of such an exiting person, which is correspondingly indicated by a circled 0 in the upper part of FIG. 1, will move across the detector element 2 first and then, some time later, across the detector element 3. As a result, the electrical signal appearing, for instance, on the output line 4 will have the shape indicated in FIG. *2a* for a person entering the controlled-access space 16, and that appearing in FIG. *2b* for a person exiting from the controlled-access space 16 through the surveillance region 8.

The lens 7, together with a non-illustrated housing supporting the components 2, 3 and 11, also prevents convection heat from reaching the detector elements 2 and 3. It is advantageous when the lens 2 is made of, or is coated with, a material which prevents radiation outside the spectral range of interest from reaching the detector elements 2 and 3, so that such unwanted radiation will not adversely affect the accuracy of measurement of the detector arrangement 1. The lens 2 has a relatively short focal length so as to concentrate the radiation from the surveillance region 8 within a relatively short distance onto active areas of the detector elements 2 and 3.

The mask 11, which is shown to be interposed between the lens 7 and the detector elements 2 and 3, may be situated instead at any other location, such as in front of the lens 7 as considered in the direction of propagation of the radiation to be detected from the region 8 under surveillance to the detector elements 2 and 3, or constitute a part of the lens 7 or of the detector arrangement 1 by being directly applied or connected thereto, and it may additionally also determine the outer boundary of the region 8 under surveillance by masking out radiation from around the surveillance region 8. Obviously, the mask 11 is so situated relative to the detector elements 2 and 3 and to the lens 7 and has such properties that it permits the radiation of interest from the respective zones 12 and 13 of the surveillance region 8 to reach the active areas of the associated detector elements 2 and 3, while simultaneously preventing all such radiation of interest and other radiation stemming from regions external to the respective surveillance zones 12 and 13 from propagating toward the active areas of the detector elements 2 and 3. Under some circumstances, the mask 11 may be omitted altogether, or replaced by a mask determining the outer boundaries of the surveillance region 8 but not masking the intervening zone situated between the surveillance zones 12 and 13.

Figure 3:
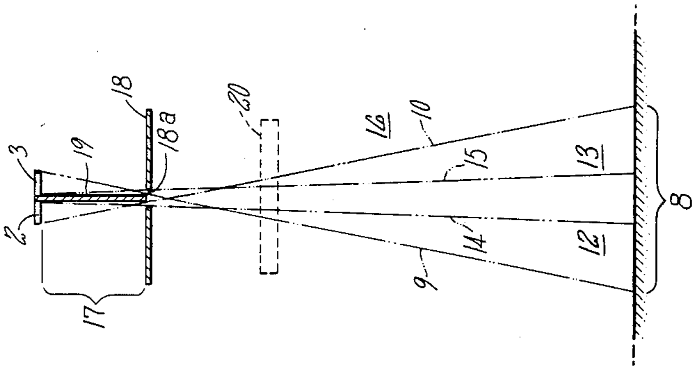
FIG. 3 is a view similar to FIG. 1 but of a modified construction of the detecting arrangement.

An alternative construction, which achieves the same results as described above but is less expensive than that of FIG. 1 since it eliminates the lens 7, is shown in FIG. 3 of the drawing where the same reference numerals as before have been used to identify corresponding elements. This construction utilizes a mask arrangement 17 that includes a transverse mask 18 having an aperture 18*a*, and a partitioning wall 19 extending from the aperture 18*a* to the detector elements 2 and 3 at right angles to the transverse mask 18. The aperture 18*a* advantageously has a very small width and provides sharp boundaries for the surveillance zones 12 and 13.

In this arrangement, and also in that of FIG. 1 especially if the lens 7 does not act as a filter that prevents passage of the radiation outside the desired range of the spectrum therethrough, it is proposed to interpose a filtering plate 20 into the path of the radiation between the surveillance region 8 and the detector elements 2 and 3, particularly when the pyroelectric detector arrangement 1 as supplied by the manufacturer does not already incorporate a filter window which performs this filtering function.

As shown in FIG. *2a* of the drawing, the pyroelectric detector arrangement 1 of the above type generates an electrical signal which first has a positive excursion from its initial value, followed by return to the initial value, a negative excursion, and final return to the initial value when a person enters the controlled-access space 16 through the surveillance region 8, temporarily adding thermal energy to the scene in the zones 12 and 13, in that succession. On the other hand, as indicated in FIG. *2b*, when a person leaves the controlled-access space 16 through the surveillance region 8, with attendant temporary increase in the thermal energy emanating from the surveillance zones 13 and 12, in that succession, the electrical signal issued by the pyroelectric detector arrangement 1 first exhibits a negative excursion from its initial value, followed by return to the initial value, a positive excursion, and final return to the initial value. Thus, the sequence in which the negative and positive excursions occur indicates whether a person has entered or left the controlled-access space 16 through the surveillance region 8. The pyroelectric detector elements 2 and 3 differentiate (with respect to time) the total optical power striking their respective active areas, with only changes in the level of the optical power producing an output. This, of course, presupposes that the combined effect of the emissivity and the temperature of the person adds energy to the scene, but it would be rare indeed that this condition would not be satisfied.

The thus modulated electrical signal then appears for instance at the output lead 4 of the detector arrangement 1, while the other output lead 5 of the detector arrangement 1 is connected to the ground. This modulated electrical signal is then evaluated by the evaluating circuit 6 which may have the construction illustrated in FIG. 4 of the drawing.

Figure 2A:
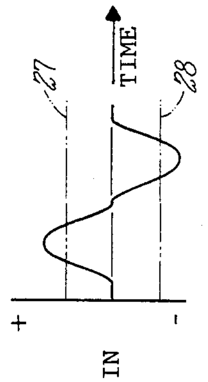
FIGS. 2*a* and 2*b* are diagrammatic representations of the changes in an analog electrical signal generated in the detecting arrangement of FIG. 1 in response to entry of a person into a surveillance region and to departure of a person from the surveillance region, respectively.
Figure 2B:
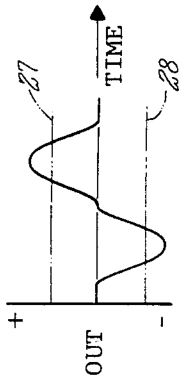

As shown there, the output lead 4 of the detector arrangement 1 is connected to the input of a high-pass filter 21 whose output is connected to the input of a low-pass filter 22. The filters 21 and 22 together constitute a bandpass filter which filters out undesired frequencies from the electrical signal issued by the detector arrangement 1, presenting a filtered electrical signal at its output. This output is then connected to the positive input of a comparator 23 and to the negative input of a comparator 24. The negative input of the comparator 23 is supplied with a reference or threshold voltage from an adjustable voltage divider 25, while a reference voltage from another adjustable voltage divider 26 is supplied to the positive input of the comparator 24. The threshold voltages are selected in the manner indicated in FIGS. 2*a* and 2*b* by the lines 27 and 28, so that the comparator 23 will issue a high signal only when the output signal of the low-pass filter 22 exceeds the reference voltage 27 and a low signal at all other times, while the output signal of the comparator 24 will have a high value only when the output signal of the low-pass filter 22 drops below the reference voltage 28 and a low value at all other times.

It will be appreciated from the above explanation of the operation of the detector arrangement 1 that it is immaterial for counting or detection purposes exactly how much a person entering or leaving the surveillance region 8 adds to the total heat contents of the scene, so long as the amount of the added heat is sufficient to cause the effective voltage reaching the respective comparators 23 and 24 to surpass the respective reference or threshold voltage levels 27 or 28. Rather, this heat amount will only influence the timing of the issuance of the changed binary signal by the comparators 23 and 24. This has the advantage that the counting operation will not be adversely affected either by the size of, or the character of the outer garments worn by, the particular person entering or leaving the surveillance region, or in most instances by the weather or heat conditions prevailing outside or within the surveillance region 8, all of which may influence the total heat output of the particular person.

Inasmuch as the output signal of the filter 23 has both a negative and a positive excursion during each passage of a person through the surveillance region 8, each comparator 23 and 24 will issue a high signal during each such passage. However, as may be ascertained from FIGS. 2*a* and 2*b*, these high signals will be in one lead/lag relationship for a person entering the controlled-access space 16, and in the reverse lead/lag relationship for a person leaving the space 16.

Figures 4, 5:
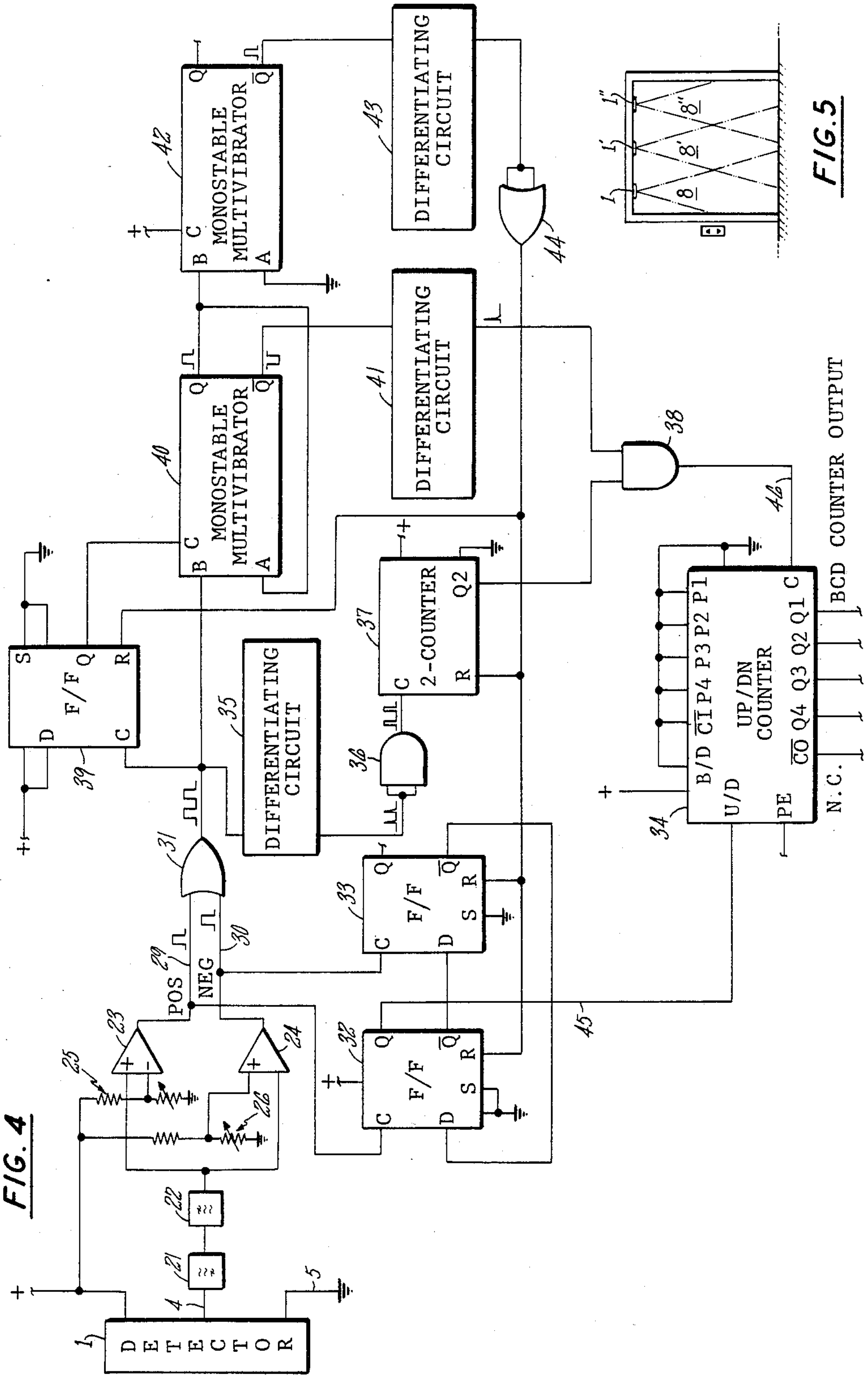
FIG. 4 is a circuit diagram depicting an evaluation circuitry which may be used for evaluating the signals received from the detecting arrangement of FIG. 1.
FIG. 5 is a front elevational view of an entryway illustrating the disposition of a detecting system including three of the detecting arrangements of FIG. 1 relative to the entryway.

In the construction illustrated in FIG. 4 of the drawing, the output signals of the comparators 23 and 24, which are respectively identified as POS and NEG, are supplied by respective electrical connections 29 and 30 to the inputs of an OR-gate 31. Consequently, two binary "1" signals will appear in close succession at the output of the OR-gate 31 upon each passage of a person through the surveillance region 8, regardless of the direction of travel.

The POS signal is also supplied to a clock input C of a first flip-flop 32, whereas the NEG signal is also supplied to a clock input C of a second flip-flop 33. The Q output of the first flip-flop 32 is connected to an up/-down input U/D of an up-and-down counter 34. The $\overline{Q}$ output of the first flip-flop 32 is connected to the data input D of the second flip-flop 33, and the $\overline{Q}$ output of the second flip-flop 33 is connected to the data input D of the first flip-flop 32. As a result, when the POS signal leads the NEG signal with the flip-flops 32 and 33 in their reset states, the binary "1" signal at the $\overline{Q}$ output of the second flip-flop 33 will appear at the D input of the first flip-flop 32 at the time of change in the POS signal to the binary "1" value and thus will be supplied to the U/D input of the counter 34, incrementing its count by one when the next clock signal arrives to a clock input C of the counter 34. Then, by the time the NEG signal changes its value to binary "1", the POS signal value has already changed back to binary "0", so that the first flip-flop 32 is not being clocked and the output signal appearing at its Q output thus does not change. Conversely, when the POS signal lags the NEG signal with the flip-flops 32 and 33 again in their reset states, the binary "1" signal at the $\overline{Q}$ output of the first flip-flop 32 will appear at the D input of the second flip-flop 33 at the time of change in the NEG signal to the binary "1" value and thus a binary "0" value will appear at the $\overline{Q}$ output of the second flip-flop 33 and thus at the D input of the first flip-flop 32. Then, at the time the POS signal changes its value to binary "1", this binary "0" value will propagate to the Q output of the first flip-flop 32 and from there to the U/D input of the counter 34, decrementing its count by one at the time of arrival of the next following clock pulse to the C input of the counter 34. Thus, it may be seen that the count of the counter 34 will be increased each time the binary "1", in the POS signal precedes that in the NEG signal, and decreased each time the binary "1" in the NEG signal precedes that in the POS signal, in each instance at the time of arrival of the next clock pulse to its C input.

The output of the OR-gate 31 is connected to the input of a differentiating circuit 35 of a known construction which converts each of the two square-wave signals issued by the OR-gate 31 into a spike-shaped pulse. The succession of these two pulses is then supplied to the two inputs of an AND-gate 36 which converts these pulses in a wellknown manner into short-duration square-wave signals. These signals are then supplied to a counting input of a counter 37 that has a Q2 output that issues a binary "1" signal after counting to two. This output signal is then supplied to one input of another AND-gate 38 to enable the latter. It may be seen that the gate 38 will be enabled only when the counter 37 has counted two incoming signals before being reset. As will be explained below, this means that the gate 38 will be enabled only when the two signals being counted by the counter 37 are so close to one another in time that the likelihood that they could be generated in any other manner than by a person passing through the surveillance region 8 is negligible, if at all present. In this manner, it is assured that two spurious signals resulting from causes other than the passage of a person through the surveillance region 8 will be prevented from incrementing or decrementing the count of the counter 34.

The succession of the two output pulses of the OR-gate 31 is also supplied to the clock input C of another flip-flop 39 that issues a binary "1" signal at its Q output in response to the first one of the signals of this succession and does not change its state until reset, and to an input B of a monostable multivibrator 40 having a relatively large time constant. The Q output and the A input of the monostable multivibrator 40 are connected with one another to prevent retriggering of the monostable multivibrator 40 during its timing period. The Q output of the flip-flop 39 is connected to the clock input C of the monostable multivibrator 40 which thus commences its operation when the signal on its C input is high and the signal on its B input changes to low, and continues to operate for the duration of its time constant. This means that a binary "1" signal appears on the Q output and a binary "0" signal appears at the $\overline{Q}$ output of the monostable multivibrator 40 for the duration of its timing period.

The $\overline{Q}$ output of the monostable multivibrator 40 is connected to the input of another differentiating circuit 41 which issues a spike-shaped output pulse when the signal supplied thereto from the $\overline{Q}$ output of the monostable multivibrator 40 changes its value from binary "0" to binary "1", that is, at the end of the operation of the monostable multivibrator 40. The output pulse of the differentiating circuit 41 is then supplied to the other input of the AND-gate 38 and passes therethrough if the gate 38 has been previously enabled by the signal from the Q2 output of the counter 37. The output of the gate 38 is connected to the clock input of the up-and-down counter 34, thus enabling the count of the latter to be incremented or decremented by the signal appearing at its U/D input.

The Q output of the monostable multivibrator 40 is also connected to the B input of another monostable multivibrator 42 having a relatively small time constant, whose clock input C is permanently held at a high level and whose A input is held permanently at a low level. This monostable multivibrator 42 responds to the change in the value of the signal supplied to its B input from high to low by issuing a square-wave output signal at its $\overline{Q}$ output. This signal is then converted by still another differentiating circuit 43 into a spike-shaped pulse which is supplied to the two inputs of another OR-gate 44 the output of which is connected to the resetting inputs R of the three flip-flops 32, 33 and 39 and of the counter 37. Thus, these components will be reset after each succession of two signals arriving on the lines 29 and 30.

It will be easily understood that, because of the use of a single up-and-down counter 34, the signals appearing at the Q1, Q2, Q3 and Q4 outputs of this counter 34 are representative of the number of people present in the controlled-access space 16 at any given time. However, two separate counters, one for the up count and the other for the down count, could be used instead if it was desired to collect information about the number of people who have entered and who have left the controlled-access space 16 during a given time period, and these separate counts could then be combined, if so desired. If the surveillance region were selected to be a doorway or other entryway to an elevator landing area, the running total obtained from the up-and-down counter 34, or the combined running total or the separate counts of the two separate counters, could be used for efficiently dispatching the elevators to the respective floors in accordance with demand. The counts of the individual counters would then also provide information as to the total number of people who have passed through the respective surveillance region in either direction during a given period of time, and thus the number of people who have used the elevators to travel to and from the particular floor, especially when the arrangement 1 is installed at the elevator doorway. In each of these cases, the signals appearing at an output line 45 from the Q output of the first flip-flop 32 and at an output line 46 from the AND-gate 38 are being used to operate the counter or counters if such discrete counter or counters are provided. Yet, such signals may just as well be supplied to a computer, such as that used for controlling the operation of the elevators, for evaluation, use and/or display.

The detecting arrangement of the present invention as described so far performs well, especially when the width of the surveillance region 8 is such that only one person can pass through at any given time. However, this condition is often not satisfied, that is, the doorway or other entryway and thus the area to be surveilled for the passage of people therethrough is wide enough to permit two people to pass therethrough at the same time either in the same direction or in opposite directions. To provide reliable counting even under these circumstances, it is contemplated by the present invention, as indicated in FIG. 5 of the drawing, to arrange three detector arrangements 1, 1' and 1'' above the doorway. The field of view or surveillance region 8' of the central detector arrangement 1' partially overlaps the vision field or surveillance region 8 and 8'' of the lateral detector arrangements 1 and 1'', respectively. It is to be noted in this context that, instead of using only two detector arrangements, as would be expected for a doorway that is only wide enough to let two people through at any given time, three such detecting arrangements are being used in accordance with the present invention.

Figure 6:
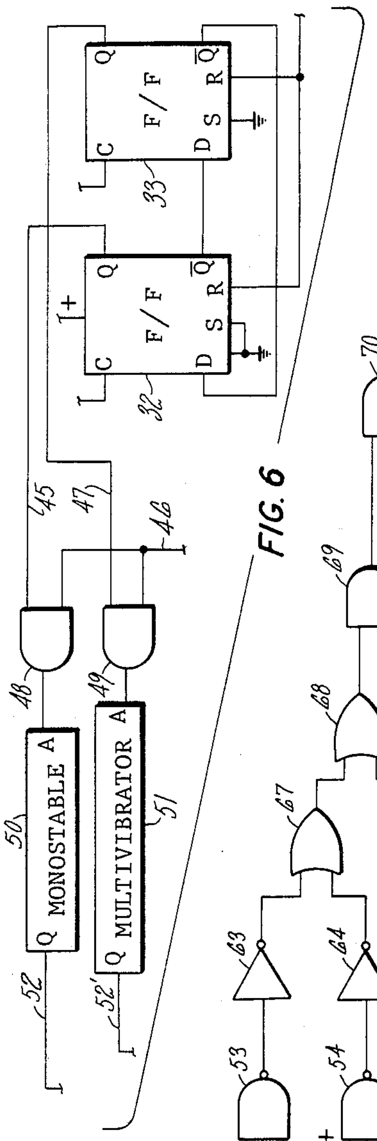
FIG. 6 is a circuit diagram of an output portion of the evaluation circuitry of FIG. 4 as modified for use with the detecting system of FIG. 5.

The detector arrangements 1' and 1'' are constructed in the same manner as disclosed above for the detector arrangement 1, and each of them has associated therewith an evaluating circuitry that is basically the same as the evaluating circuitry 6 explained above in conjunction with FIG. 4 of the drawing, except as noted below with reference to FIG. 6 of the drawing which illustrates only that portion of the evaluating circuitry 6 which differs from the above-discussed single-detector version.

In this expanded version of the detector system, the output line 45 (from the Q output of the first flip-flop 32) is connected to one input of a first discriminating AND-gate 48, while another output line 47 connects the Q output of the second flip-flop 33 with one input of a second discriminating AND-gate 49. The output line 46 (from the AND-gate 38) is connected to another input of each of the discriminating AND-gates 48 and 49. The outputs of the gates 48 and 49 are connected to the A inputs of respective monostable multivibrators 50 and 51, respectively. The monostable multivibrator 50 issues an ENTER signal on its Q output to an output line 52 when a person enters, and the monostable multivibrator 50 issues an EXIT signal on its Q output to an output line 52' when a person leaves, the controlled-access space 16 through the surveillance region 8, 8' or 8'' of the respective detector arrangement 1, 1' or 1''.

Figure 7:
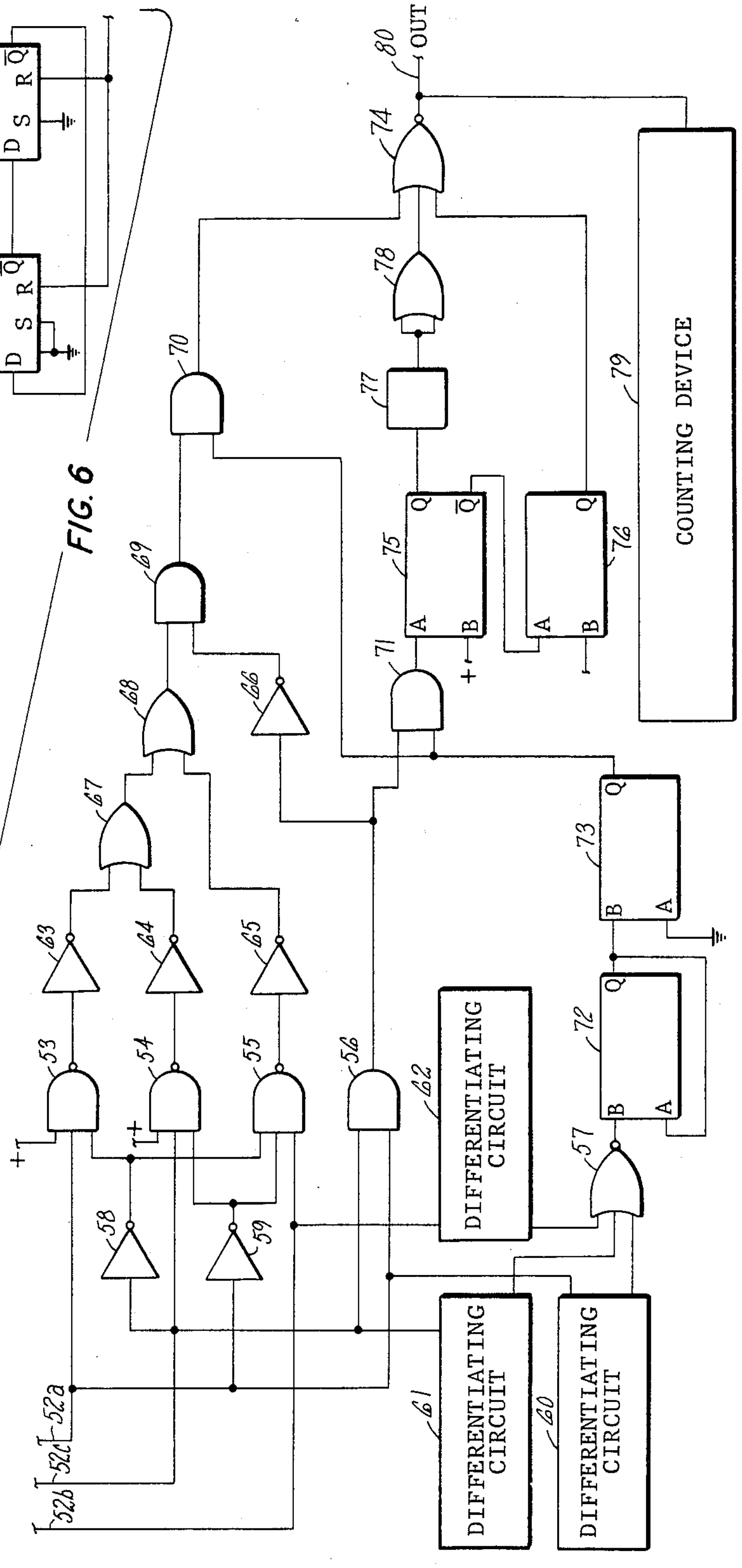
FIG. 7 is a diagrammatic representation of a combination and counting circuitry which may be used with the detecting system of FIG. 5 and with the evaluation circuitry of FIG. 4 as modified in FIG. 6.

These signals issued by one of the evaluating circuits 6 are then supplied to two identical combination and counting circuits, one for the ENTER signals and the other for the EXIT signals, together with the corresponding signals from the two remaining evaluating circuits 6. Inasmuch as these two combination and counting circuits have the sam constructions and operate in the same manner, only that for the ENTER signals will be described below with reference to FIG. 7 of the drawing. Herein, the reference numerals **52*a*, 52*b* and 52*c* have been used to identify the lines carrying the ENTER signals from the multivibrators 50 associated with the detector arrangements 1, 1' and 1''**, respectively.

The ENTER signal on the line 52a is supplied directly to an input of a NAND-gate 53 and to an input of an AND-gate 56, through an inverter 59 to an input of each of NAND-gates 54 and 55, and through a differentiating circuit 60 to an input of a NOR-gate 57. The ENTER signal on the line 52c is supplied directly to an input of the NAND-gate 54 and to another input of the AND-gate 56, through an inverter 58 to an input of each of the NAND-gates 53 and 55, and through a differentiating circuit 61 to an input of the NOR-gate 57. The ENTER signal on the line 52b is supplied directly to an input of the NAND-gate 55 and through a differentiating circuit 62 to an input of the NOR-gate 57. The outputs of the gates 53 and 54 are connected, through respective inverters 63 and 64, to respective inputs of an OR-gate 67 whose output is coupled to one input of another OR-gate 68. The output of the NAND-gate 55 is connected through an inverter 65 to another input of the OR-gate 68, while the output of the AND-gate 56 is connected through an inverter 66 to an input of another AND-gate 69, whose other input is coupled to the output of the OR-gate 68. The output of the gate 69 is connected to one input of a further AND-gate 70, while the output of the gate 56 is also connected to one input of still another AND-gate 71.

The output of the NOR-gate 57 is connected to the B input of a monostable multivibrator 72 whose Q output is connected with its A input to prevent retriggering of the monostable multivibrator 72 during its timing period, and also with the B input of another monostable multivibrator 73 whose A input is connected to the ground. The output signal appearing at the Q output of the monostable multivibrator 73 is supplied to another input of each of the gates 70 and 71.

The output of the AND-gate 70 is directly connected to one input of a NOR-gate 74. The output of the AND-gate 71 is connected to the A input of a monostable multivibrator 75 whose B input is being permanently held at a high level and whose $\overline{Q}$ output is connected to the A input of another monostable multivibrator 76 whose B input is also being permanently held at a high level. The Q output of the monostable multivibrator 76 is directly connected to another input of the NOR-gate 74, while the Q output of the monostable multivibrator 75 is connected with still another input of the NOR-gate 74 through a series connection of a differentiating circuit 77 and an OR-gate 78.

Because of this construction, a single output signal indicative of entry of a person will appear at the output of the NOR-gate 74 either when entry is detected through the surveillance region 8 (of FIG. 5) but not through the surveillance region 8'', or when entry is detected through the surveillance region 8'' but not through the surveillance region 8, or when entry is detected through the surveillance region 8' but not through either one of the surveillance regions 8 and 8''. On the other hand, two such signals will appear at the output of the NOR-gate 74 when entry is detected simultaneously through both of the surveillance regions 8 and 8''. Each such output signal is then supplied to the input of a counting device 79 of a conventional construction which thus keeps a running total of the number of people who have actually entered the controlled-access space 16 through the respective entryway since the commencement of the counting operation of the counting device 79. Obviously, the counting device 79 may be reset from time to time or as desired to recommence its counting operation.

It will be readily understood that the other combination and counting circuit will provide a separate running total of the number of people who have left the controlled-access space through the same entryway. This other combination and counting circuit operates in the same manner as described above but on the basis of the EXIT signals appearing at the output lines 52 of the respective evaluating circuits 6 associated with the arrangements 1, 1' and 1''. These separate running totals may then be combined, if so desired, to obtain the actual number of people present in the controlled-access area 16 at any given time. This may be accomplished, for instance, by supplying the output signals of the gates 74 of the two combination and counting circuits through respective output lines 80 to an up-and-down counter arrangement of a known construction, or to a computer. Moreover, the signals on the output lines 80 may also be used for additional purposes. For example, when the entryway is the doorway of an elevator, such signals may be used to keep a score of the traffic flow through the building on the basis of the number of people entering and leaving the elevator at the respective floors.

Despite the above-described precautions, it is still possible, albeit highly unlikely, that the count provided by the counters or counter may be inaccurate. Therefore, in practical applications, it is desirable to provide a reset for the counters or counter to delete from time to time residual counts caused by inaccuracies of the detector arrangements 1, 1' and/or 1'' or of their operation. This housekeeping chore can be performed by the main controller or computer, for instance, in elevator applications, by comparing destination floor button activity for the respective floors with the counter output. So, for instance, the up-and-down counter could be reset to zero after a predetermined, relatively long period of destination floor button inactivity.

While the present invention has been illustrated and described as embodied in a particular construction of the detecting or people counting arrangement, it will be appreciated that the present invention is not limited to this particular example; rather, the scope of protection of the present invention is to be determined solely from the attached claims.

I claim:

1. An arrangement for detecting the passage of living beings through a surveillance region into and out of a controlled-access space, comprising at least three pyroelectric detector devices arranged side-by-side with respect to one another above an entryway to be surveilled such that the surveillance regions of said detector devices transversely span said entryway, each of said detector devices including two detector elements situated in succession in the direction of passage into the controlled-access space and each having an active area directly exposed to thermal radiation from the surveillance region and operative for converting thermal radiation energy received thereby into an electrical signal, said detector elements being coupled in such a manner that said electrical signal has one polarity for one of the detector elements and the opposite polarity for the other detector element;

means for so optically subdividing said surveillance region of each of said detector devices into two surveillance zones arranged in succession as considered in said direction that thermal radiation energy from a living being passing through the surveillance region reaches initially only one and subsequently only the other of said detector elements when such living being is entering, and initially only said other and subsequently only said one detector element when such living being is leaving, the controlled-access space, with attendant generation of said opposite polarity electrical signals by said detector device in one lead/lag time relationship for a living being entering, and in the opposite lead/lag relationship for a living being leaving, the controlled-access space through said surveillance region;

means for evaluating said electrical signals of said detector devices to provide an indication of the entry and/or exit of a living being through the respective ones of said surveillance regions from the then existing lead/lag relationship of said opposite polarity electrical signals, including at least three generating means each associated with a different one of said detector devices and operative for generating a first output signal when one of said opposite polarity signals leads the other; and further comprising a combination circuit receiving said first signals from all of said generating means and issuing a single output signal when said first signal is present from said generating means associated with the central one but not from either one of said generating means associated with the lateral ones of said detector devices, or from one but not from the other of said generating means associated with said lateral detector devices, and two output signals when said first signal is present from said generating means associated with both of said lateral detector devices.

2. The arrangement as defined in claim 9, wherein each of said optically subdividing means includes masking means.

3. The arrangement as defined in claim 2, wherein said masking means includes a transversely extending mask having an aperture, and a partitioning wall extending from said aperture toward and between said detector elements.

4. The arrangement as defined in claim 9, wherein each of said optically subdividing means includes a lens which concentrates the thermal radiation from each of said surveillance zones on said active area of a different one of said detector elements.

5. The arrangement as defined in claim 4, wherein said optically subdividing means includes means for masking an intervening zone situated between said surveillance zones to prevent thermal radiation from said intervening zone from reaching either one of said detector elements.

6. The arrangement as defined in claim 9, wherein said evaluating means includes means for generating a first output signal when one of said opposite polarity signals leads the other, and means for cumulatively storing said first output signals.

7. The arrangement as defined in claim 6, wherein said generating means is further operative for generating a second output signal when said one of said opposite polarity signals lags behind the other, and means for cumulatively storing said second output signals.

8. The arrangement as defined in claim 7, wherein said first and second output signals of said generating means have different binary values; and wherein said cumulatively storing means includes an up-and-down counter having a counting input receiving both said first and said second output signals from said generating means, said counter being operative for increasing its count in response to said first output signals and reducing its count in response to said second output signals.

9. The arrangement as defined in claim I, and further comprising means for cumulatively storing said output signals of said combination circuit.

10. The arrangement as defined in claim 1, wherein said generating means further generates a second output signal when said one of said opposite polarity signals lags behind the other; and further comprising an additional combination circuit similar to said combination circuit and receiving said second signals from all of said generating means.

11. The arrangement as defined in claim 10, and further comprising means for cumulatively storing said output signals of said additional combination circuit.

* * * * *

UNITED STATES PATENT AND TRADEMARK OFFICE
CERTIFICATE OF CORRECTION

PATENT NO. : 4,799,243

DATED : January 17, 1989

INVENTOR(S) : Bruce E. Zepke

It is certified that error appears in the above-identified patent and that said Letters Patent is hereby corrected as shown below:

Claim 2, Column 13, line 33: After "claim" delete "9" and insert --1--.

Claim 4, Column 13, line 41: After "claim" delete "9" and insert --1--.

Claim 6, Column 14, line 10: After "claim" delete "9" and insert --1--.

Signed and Sealed this

Second Day of June, 1992

*Attest:*

DOUGLAS B. COMER

*Attesting Officer* — *Acting Commissioner of Patents and Trademarks*